June 20, 1944.  M. VON ARDENNE  2,352,043
DIAPHRAGM FOR ELECTRON OPTICAL APPARATUS
Filed Feb. 6, 1941
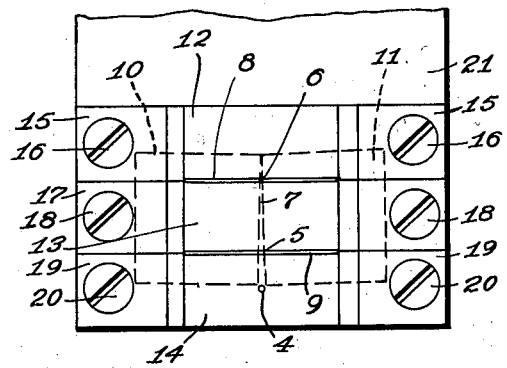
Inventor
MANFRED VON ARDENNE
By
Attorney.

Patented June 20, 1944

2,352,043

UNITED STATES PATENT OFFICE 2,352,043

DIAPHRAGM FOR ELECTRON OPTICAL APPARATUS

Manfred von Ardenne, Berlin-Lichterfelde, Germany; vested in the Alien Property Custodian Application February 6, 1941, Serial No. 377,713
In Germany January 15, 1940

3 Claims. (Cl. 250—49.5)

This invention relates to a diaphragm which is adapted to be inserted in the path of the cathode ray of an electron optical apparatus.

Such diaphragms, particularly diaphragms employed in electronic microscopes, often require an aperture having a very small diameter in the case of a considerable diaphragm thickness (mass thickness). As is well known, it has hitherto been possible to provide by the mechanical method a diaphragm with a bore of a diameter amounting only to $50\mu$. The object of the invention consists in manufacturing diaphragms having effective openings of smaller dimensions. This may be accomplished according to the invention by employing the point of crossing of two slits as a diapragm aperture. In this manner it is possible to provide a diaphragm with an aperture, the dimensions of which amount only to a few $\mu$ in the case of a considerable diaphragm thickness. The diaphragm is provided with two slits which are formed, for instance, of sheets between tantalum of 0.1 mm. thickness having ground and polished edges. The grinding is preferably effected in a plane perpendicular to the plane of the sheet of metal, and the ground surface must be polished in order to attain an accurate diaphragm channel, especially in the case of the smallest aperture dimensions to be adjusted. The diaphragm aperture is preferably formed by so crossing two narrow slits as to be perpendicular to each other. The slit width is preferably adjusted by the use of a dissecting microscope and the sheets forming the slits are then fastened by a clamping device.

According to the invention a multiple cross-slit diaphragm may be made in a simple manner. To this end, the arrangement is so designed that one slit may be so adjusted as to assume the form of a wedge and that two or more slits lying perpendicularly to the wedge-shaped slit are formed of three or more sheets of metal. The wedge-shaped slit may be formed by means of two sheets of metal which abut at one end thereof and are opened at the other end, for instance, $1-2 \times 10^{-2}$.

Such a multiple cross-slit diaphragm is shown by way of example in the accompanying drawing. In this embodiment a diaphragm arrangement is disclosed which may be inserted in the path of the cathode ray of an electronic microscope.

Fig. 1 shows a top view of a diaphragm arrangement and Fig. 2 a cross-sectional view thereof. 1 and 2 denote the pole shoes of the magnetic lenses of an electronic microscope (not shown). 3 is the channel for the passage of the electron ray. In this path there is inserted a diaphragm arrangement. This arrangement has a mechanically formed diaphragm aperture 4 having a width of, for instance, 50 $\mu$ and two cross-slit diaphragm apertures 5 and 6, the width thereof amounting, for instance, to 10 $\mu$ and 3 $\mu$ respectively. The two cross-slit diaphragm apertures are formed by the slits 7, 8 and 9. To form the slit 7, two sheets of metal 10 and 11 are employed which are adjusted as shown in a wedge-shaped manner. The slits 8 and 9 are formed by the three sheets of metal 12, 13 and 14.

The adjustment of the wedge-shaped slit 7 is effected by means of a dissecting microscope. The sheets of the wedge slit are then fastened by means of a grip member 15 with the aid of the screws 16. The slit 8 is then adjusted by the dissecting microscope with the aid of the sheets 12 and 13 and then fastened with the aid of the corresponding grip members 17, 18. Also the slit 9 may then be adjusted with the aid of the sheet 14 and is fastened by the grip members 19, 20.

By adjusting on the one hand the wedge-shaped slit 7 as described above and by selecting on the other hand the position of the slits 8 and 9 with respect to the wedge-shaped slit 7, it is possible to obtain diaphragm apertures having the same dimensions in both main directions. The fact that the two slits forming a diaphragm aperture and in different planes and that the diaphragm aperture has a square cross-section has hardly any influence on the quality of the microscopical image.

Without rendering the adjustment of the diaphragm too difficult it is possible to provide a diaphragm with an aperture having as small a diameter as $3 \times 10^{-3}$ mm. 21 denotes a slidable diaphragm, in whose lateral parts are secured the set screws 16, 18 and 20. The entire device may be displaced in the main direction of the wedge-shaped slit 7 so that the diaphragm openings 4, 5 and 6 may be inserted at will in the path of the ray of the electronic microscope. The single diaphragm openings 4, 5 and 6 lie on a straight line coinciding with the direction of displacement so that the passage from one opening to the other is facilitated to a great extent.

What is claimed is:

1. In an electron microscope having upper and lower pole shoe means which are each provided with a central opening for the passage of electron rays therethrough and which are located in spaced apart relation with said openings in alignment with each other, the combination of diaphragm means adjustably slidable in the space between said pole shoe means and adapted to be moved into a position in the path of said electron rays to provide a limiting aperture for said rays, said diaphragm means comprising a diaphragm member slidably mounted in the space between said pole shoe means, said diaphragm member having an opening therethrough, a pair of sheet members positioned across the opening in said diaphragm member, said sheet members being spaced apart to provide a narrow slit between their adjacent edges, a second pair of sheet members positioned across said first pair of sheet members, said second pair of sheet members being spaced apart to form a narrow slit between their adjacent edges and in conjunction with said first named sheet members providing a small aperture in the diaphragm member, and means for securing said sheet members to the diaphragm member.

2. In an electron microscope, the combination with upper and lower pole shoe means which are each provided with a central opening for the passage of electron rays therethrough and which are located in spaced apart relation with said openings in alignment with each other, of movably adjustable diaphragm means slidable in the space between said pole shoe means for providing a limiting aperture for said electron rays as they pass between said pole shoe means, said diaphragm means comprising a diaphragm member slidably mounted in the space between said pole shoe means, said diaphragm member having an opening therethrough, a pair of sheet members positioned across the opening in the diaphragm member, said sheet members lying in substantially the same plane and being spaced apart to provide a narrow slit between their adjacent edges, a plurality of additional sheet members positioned across the first named pair of sheet members and the slit formed between them, said additional sheet members being positioned in spaced apart relation to each other to provide a narrow slit between the adjacent edges of any two adjacent additional sheet members, the slits between the additional sheet members providing in conjunction with the slit formed between the first named pair of sheet members different sized apertures in the diaphragm member, and clamp means fastening said sheet members to said diaphragm member.

3. In an electron microscope having upper and lower pole shoe means which are each provided with a central opening for the passage of electron rays therethrough and which are located in spaced apart relation with said openings in alignment with each other, the combination of diaphragm means adjustably movable in the space between said pole shoe means and provided with a plurality of different sized apertures any one of which may be brought into the path of said rays to provide a limiting aperture for the rays, said diaphragm means comprising a diaphragm member slidable in the space between said pole shoe means and provided with an opening therethrough, a pair of sheet members positioned across the opening in said diaphragm member, said pair of sheet members lying in the same plane and located adjacent each other in angular relation to have their adjacent edges provide a wedge shaped narrow slit between them, a plurality of additional sheet members positioned across the first named pair of sheet members and the wedge shaped slit, said additional sheet members being in spaced apart relation to each other with their adjacent edges parallel to provide a narrow slit between any two adjacent additional sheet members, the slits between the said additional sheet members in conjunction with the wedge shaped slit providing different sized apertures in the diaphragm member having widths of the order of from three microns to ten microns, and clamp means fastening said sheet members to the diaphragm member.

MANFRED von ARDENNE.